(12) United States Patent
Panas et al.

(10) Patent No.: US 11,789,333 B2
(45) Date of Patent: Oct. 17, 2023

(54) SYSTEM AND METHOD FOR TEMPORAL DISPERSION COMPENSATOR

(71) Applicants: Lawrence Livermore National Security, LLC, Livermore, CA (US); Bright Silicon Technologies, Inc., San Francisco, CA (US)

(72) Inventors: Robert Matthew Panas, Dublin, CA (US); Frank Ravizza, Brentwood, CA (US); Robert McHenry, San Francisco, CA (US)

(73) Assignees: Lawrence Livermore National Security, LLC, Livermore, CA (US); Bright Silicon Technologies, Inc., San Francisco, CA (US)

(*) Notice: Subject to any disclaimer, the term of this patent is extended or adjusted under 35 U.S.C. 154(b) by 131 days.

(21) Appl. No.: 17/188,656

(22) Filed: Mar. 1, 2021

(65) Prior Publication Data

US 2022/0276544 A1   Sep. 1, 2022

(51) Int. Cl.
*G02F 1/29* (2006.01)
*G02B 27/12* (2006.01)
*H01S 3/00* (2006.01)

(52) U.S. Cl.
CPC ......... *G02F 1/292* (2013.01); *G02B 27/123* (2013.01); *H01S 3/0057* (2013.01); *H01S 3/0071* (2013.01)

(58) Field of Classification Search
CPC ..... G02B 27/123; G02F 1/292; H01S 3/0057; H01S 3/0071

USPC ......................................................... 359/618
See application file for complete search history.

(56) References Cited

U.S. PATENT DOCUMENTS

| | | |
|---|---|---|
| 2013/0242400 A1 | 9/2013 | Chen |
| 2018/0364420 A1* | 12/2018 | Menard ................ G02B 6/3518 |
| 2019/0004394 A1 | 1/2019 | Shin et al. |
| 2020/0182792 A1 | 6/2020 | Vaziri |

FOREIGN PATENT DOCUMENTS

| | | |
|---|---|---|
| KR | 101120471 B1 | 3/2012 |
| WO | WO-2016034247 A1 | 3/2016 |

OTHER PUBLICATIONS

International Search Report and Written Opinion regarding Application No. PCT/US2022/018172, dated Jul. 8, 2022.

* cited by examiner

*Primary Examiner* — William Choi
(74) *Attorney, Agent, or Firm* — HARNESS, DICKEY & PIERCE, P.L.C.

(57) ABSTRACT

The present disclosure relates to a system for modifying temporal dispersion in an optical signal. The system makes use of a segmented array including a plurality of independently controllable, reflective optical elements. The optical elements are configured to segment a received input optical signal into a plurality of beamlets, and to reflect and steer selected ones of the plurality of beamlets in predetermined angular orientations therefrom. A variable optical dispersion subsystem is used which has a plurality of optical components configured to receive and impart different predetermined time delays to different ones of the received beamlets, and to output the plurality of beamlets therefrom.

27 Claims, 5 Drawing Sheets

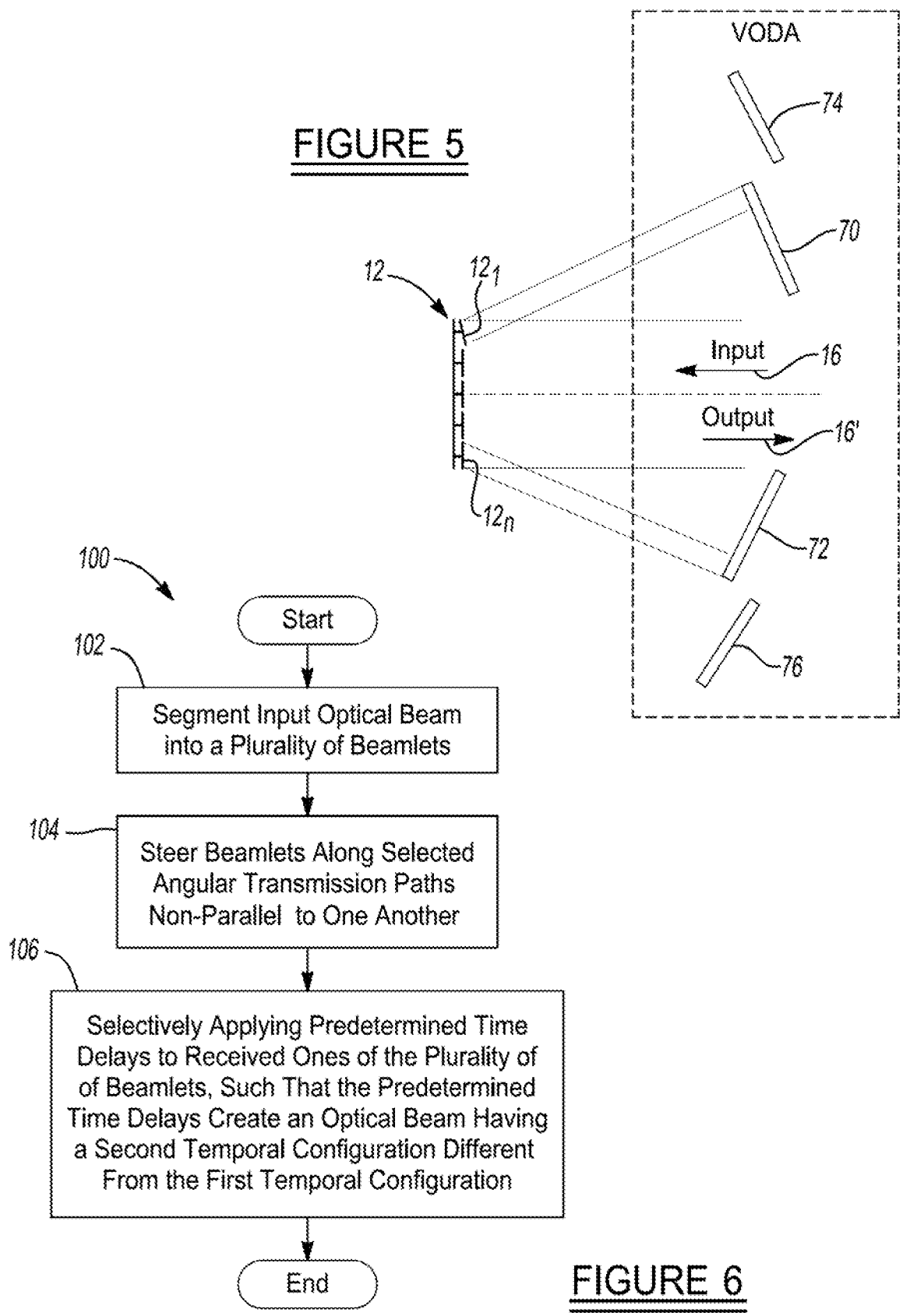

SYSTEM AND METHOD FOR TEMPORAL DISPERSION COMPENSATOR

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to systems and methods for modifying temporal dispersion in an optical signal being emitted from a segmented beam steering array, and more particularly to systems and methods for modifying temporal optical dispersion dynamically, in real time, to correct for temporal optical dispersion of an optical signal emitted from a segmented beam steering array.

BACKGROUND

The statements in this section merely provide background information related to the present disclosure and may not constitute prior art.

Recent work has shown that segmented reflective beamsteering arrays provide substantial potential benefits for miniaturizing and improving optical systems. These arrays are often made up of repeating reflective elements where each can be individually controlled. In some systems this control is simply piston motion while in other systems this control may include each of tip, tilt and piston control for each element of the array. In all cases, this small-scale, sub-aperture control of the optical surface enables rapid (i.e., real time) and fine control for beamsteering purposes. The small scale of the individual elements substantially reduces their inertia (mechanical or electrical) relative to the actuation, enabling these emerging technologies to generally operate much faster than conventional macroscopic beamsteering systems. The small scale of the individual elements also reduces the size, weight and power of the beamsteering system, enabling it to be used in many more areas than classic solutions like gimbals. All these benefits are derived from segmenting the reflective surface.

Array segmentation provides numerous benefits, but it also generates some drawbacks, including variability of path length. When a pulse hits a single reflective surface, it is steered while retaining temporal coherence. However, when a pulse hits an array of reflective elements, where all the array elements are pointed in the same direction and are attached to a planar array structure, then the pulse ends up requiring different lengths of time to traverse the numerous optical paths, thus leaving the reflective array without the same level of temporal coherence as a single fused surface. This issue is removed in the simple case that the reflective elements are all at their equilibrium (i.e., flat) orientation, parallel to the plane of the array structure. In this case the segmented surface generates no temporal dispersion. But as the segments start to steer off equilibrium the scale of temporal dispersion rises from 0 to a maximum of about 30 ps time delay from one side of a 2 cm aperture to the other, assuming a maximum mechanical steering angle of 15 degrees. The term "dispersion" is used here as an analogy to the technique used in optics where a pulse is dispersed based on wavelength. Segmented arrays produce an analogous dispersive effect, but rather than being a function of wavelength this is a function of beam spatial distribution over the array. The term "spatially dependent dispersion" will simply be called "dispersion" or "temporal dispersion" throughout the following discussion of the present disclosure.

Temporal dispersion is not an issue for a continuous wave (CW) laser as the path length variation can be set to an integer multiple of the monochromatic laser wavelength to retain coherent operation. But wideband systems and short pulse systems will start to see degradation due to the temporal dispersion.

The challenge of temporal dispersion has limited the application space of the segmented beamsteering technology. There are a range of applications using segmented beamsteering with CW and long pulse laser systems, such as monochromatic laser manufacturing, sensing or communications laser communications. The capability to operate with wideband sources or ultrashort pulses would significantly boost application utility in many of these cases. For example, short pulse lasers would become viable options for enabling cleaner laser cut features in manufacturing. Short pulse lasers would also become viable options for wideband sensing for enhanced range or data quality in sensing applications, and for wideband data transfer in laser communications.

Accordingly, addressing the drawbacks present with segmented reflective array components, while maintaining the full steering capabilities of the elements of the array, would make such components usable in number of important applications where such segmented arrays cannot be used because of the temporal dispersion issue.

SUMMARY

This section provides a general summary of the disclosure, and is not a comprehensive disclosure of its full scope or all of its features.

In one aspect the present disclosure relates to a system for modifying temporal dispersion in an optical signal. The system may comprise a segmented array including a plurality of independently controllable, reflective optical elements. The elements may be configured to segment a received input optical signal into a plurality of beamlets, and further to reflect and steer selected ones of the plurality of beamlets in predetermined angular orientations therefrom. The predetermined angular orientations are selected in accordance with a time delay needing to be applied to each selected one of the plurality of beamlets. A variable optical dispersion subsystem may be included which includes a plurality of optical components. The optical components may be configured to impart different predetermined time delays for specific ones of the plurality of beamlets received thereon, and then to output the plurality of beamlets therefrom.

In another aspect the present disclosure relates to a system for removing temporal dispersion in an optical signal. The system may comprise a first segmented array including a first plurality of independently controllable optical elements configured to segment a received input optical signal into a plurality of beamlets, and to reflect the beamlets at selected angular orientations therefrom. A variable optical time dispersion array may be included which has a plurality of optical delay components each designed to impart a specific optical path delay for one of the plurality of beamlets passing therethrough. This imparts a unique, selected time delay to specific ones of the plurality of beamlets passing therethrough. The reflected beamlets are selectively steered by the first plurality of optical elements of the first segmented array to specific ones of the delay components to enable the delay components to impart the unique, selected time delays to specific ones of the plurality of beamlets. A second segmented array may be included which has a second plurality of independently controllable optical elements configured to receive the plurality of beamlets from the variable optical time dispersion array, and to recombine the beamlets to form a time dispersion corrected output optical signal.

In still another aspect the present disclosure relates to a method for modifying an optical signal. The method may comprise splitting a collimated optical beam having a first temporal configuration into a plurality of beamlets. The method may further comprise steering the plurality of beamlets along selected, differing angular paths, wherein the angular paths are non-parallel to one another and associated with needed predetermined time delays to be applied to the specific ones of the beamlets. The method may further include selectively applying predetermined time delays to received ones of the plurality of beamlets, depending on the selected angular path of each received one of the plurality of beamlets. The predetermined time delays create an optical beam having a second temporal configuration different from the first temporal configuration.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

FIG. 5 shows another embodiment of the system in which the optical path delays are created in fully collimated space, by using the splitting segmented array its created beamlets at angularly spaced apart, remote reflective surfaces, which create different optical path lengths when the beamlets are reflected back by the remote reflective surfaces to the splitting segmented array;

FIG. 6 is a high level flowchart setting forth a method in accordance with the present disclosure for controllably modifying a temporal configuration of an optical beam.

DETAILED DESCRIPTION

Example embodiments will now be described more fully with reference to the accompanying drawings.

The present disclosure relates to systems and methods for dynamically (i.e., in real time) compensating for temporal signal dispersion when using a segmented array. In one embodiment the present disclosure relates to a temporal dispersion compensator which may be synchronously operated with a segmented array having a plurality of signal steering elements, to retain the full segmented steering capabilities of the array elements but without the temporal dispersion suffered by conventional segmented arrays.

In various embodiments the present disclosure more specifically relates to system which includes a spatially variable, controllable time delay for the light reaching or reflected off each element of a segmented array. In various embodiments, the system described in the present disclosure produces an ideal temporal dispersion compensation approach which is a) bidirectional, so it works with light passing through it in either direction, and b) broadband so full spectrum compensation can be obtained. A plurality of approaches are set forth in the following description, at least one being a beam reversal (VODA) approach, and at least one being a transmissive VODA approach. The transmissive VODA approach is described first, but it is expected that the beam reversal (VODA) approach may actually be preferred in many implementations. Other approaches include large scale piston arrays or reflective path arrays, but all produce the same effect of reducing or entirely removing temporal dispersion associated with the operation of a segmented beam steering array.

Transmissive VODA Approach

Figure 1:
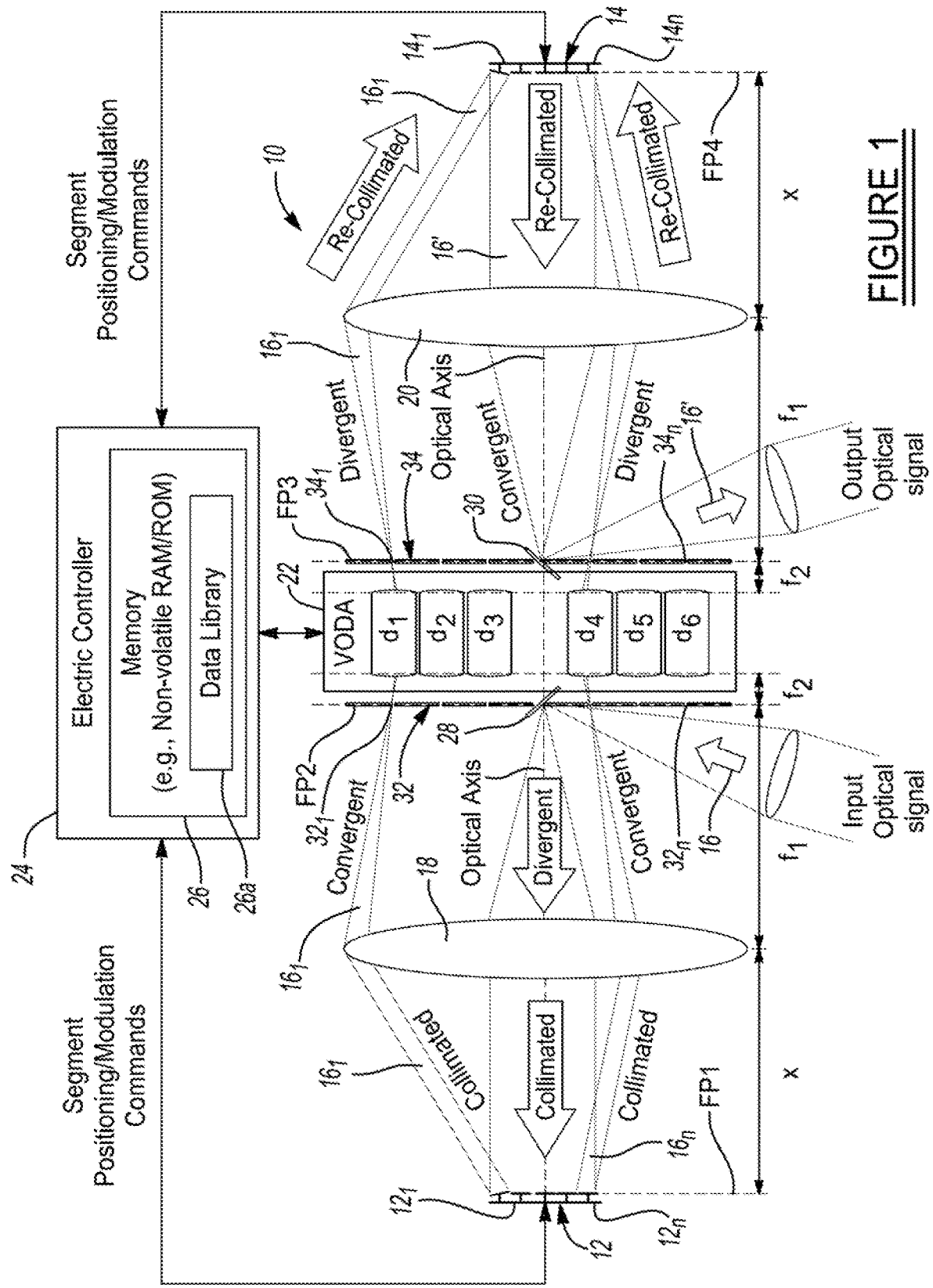
FIG. 1 is a block diagram of one embodiment of the present disclosure which forms a temporal dispersion correction system for a received optical input signal from an external subsystem.

Referring to FIG. 1, a system 10 is shown for achieving temporal dispersion compensation in accordance with the transmissive VODA approach. The system 10 achieves achieve temporal dispersion compensation using this approach by using two segmented arrays 12 and 14, each having a plurality of independently controlled optical elements $12_1$-$12_n$ and $14_1$-$14_n$. The elements $12_1$-$12_n$ and $14_1$-$14_n$ are used to segment an incoming beam 16 into a plurality of beamlets $16_1$-$16_n$, one for each of the optical element on the arrays. In this example it will be appreciated then that the segmented arrays 12 and 14 include the same number of elements, and essentially each element $12_1$-$12_n$ and $14_1$-$14_n$ is capable of forming what operates like an independently controllable (i.e., aimable) signal transmitting channel. The system 10 in this example also includes a pair of telescope lenses 18 and 20, and in this specific example each forms a 4F telescope. Positioned between the telescope lenses 18 and 20 is a variable optical delay array or subsystem 22 ("VODA"), hereinafter referred to simply for convenience as the "VODA" 22, which includes a plurality of delay components $d_1$-$d_n$. A processor based electronic controller 24 may be used to help control movement and/or tilt of the segmented arrays 12 and 14, as well as to communicate with the VODA 22. The electronic controller 24 may include a memory 26 (e.g., non-volatile RAM or ROM) for containing a library or data file 26a of information needed to help generate position or tilt commands for the elements $12_1$-$12_n$ and $14_1$-$14_n$ of the segmented arrays 12 and 14, respectively. Mirror 28 may be included to help direct the input optical signal 16 to the telescope lens 18, while mirror 30 may be used to direct a time dispersion corrected optical signal 16' to the telescope lens for subsequent output from the system 10. Collimating lens arrays 32 and 34, each made up of a plurality of collimating lens elements $32_1$-$32_n$ and $34_1$-$34_n$, respectively, are disposed on opposing sides of the VODA 22 at focal planes F2 and F3, respectively.

At a high level, operation of the system involves using the elements $12_1$-$12_n$ of the first segmented array 12 to split the incoming optical beam 16, which in this example is received as a collimated beam, into the beamlets $16_1$-$16_n$ depending on the required time delay needed for each beamlet. Each beamlet $16_1$-$16_n$ is steered towards a specific angular optical path (relative to the optical axis of the telescope lens 18) by an associated one of the elements $12_1$-$12_n$ of the segmented array 12, so that it will be received by a specific one of the delay components $d_1$-$d_n$ of the VODA 22, which will cause a known, calibrated time delay. The time delays can be generated by several means including but not limited to heights in a reflective surface and/or glass blocks of controlled thickness, making up each of the delay components $d_1$-$d_n$, as will be discussed in greater detail in the following paragraphs.

The second segmented array 14 gathers all the beamlets $16_1$-$16_n$, which now have been delayed by precisely controlled time increments by the delay components $d_1$-$d_n$, and aligns their respective output angles such that the beamlets $16_1$-$16_n$ emerge from the second segmented array 14 as a single collimated beam, represented by the dispersion corrected optical beam 16', sharing the same direction vector. The splitting and recombining segmented arrays 12 and 14, respectively, preferably are the same size as one another, and preferably also the same size as the steering segmented array (not shown) whose temporal dispersion must be compensated. This is because the system 10 system requires up to one channel of control for each channel of steering on the segmented arrays 12/14 incurring the temporal dispersion.

Also, the angle of tilt of the elements $12_1$-$12_n$ and $14_1$-$14_n$ will be the conjugate of one another. So the angle of tilt of, for example, element $12_1$ will be the conjugate of the tilt angle for element $14_1$, the angle of tilt of element $12_2$ will be the conjugate of the angle of tilt for element $14_2$, and so forth.

It is also contemplated that the system 10 may be modified to provide one or more channels of temporal control for one or more subsections or regions of the steering segmented arrays 12/14 in order to provide 'bulk' compensation. Thus, for example, a subgroup (e.g., 5, 10, 100 or any subplurality) of the elements $12_1$-$12_n$ and $14_1$-$14_n$ of teach segmented array 12 and 14 may be controlled as a single group of elements. While this would enable the system 10 to remove the majority of the temporal dispersion, it would not necessarily guarantee the ability to remove virtually all dispersion during operation. Any variation in size between the segmented arrays 12/14 represents excess unused channels from the perspective of the system 10 operation.

Optical Steps (Input)

With further reference to FIG. 1, the optical input beam 16 is assumed to be collimated, whether from the steering array (not shown) or from a source about to pass the optical input beam to the steering array. This optical input beam 16 is focused using the same focal length lens as the telescope lenses 18 and 20 forming approximately the 4-f telescope between the splitting and recombining segmented arrays 12 and 14, respectively. As noted above, in this example the lenses 18 and 20 each have a focal length f1 but this is not required. The focused optical input beam 16 is steered using mirror 28 to pass through the optical axis of the 4-f telescope, and the telescope lens 18 is used to re-collimate the input optical signal 16 before the input optical signal illuminates the splitting segmented array 12. This illumination is normal to the surface of the segmented array 12, which is located at the focal plane FP1 of the left-hand side of the overall 4-f telescope (i.e., to the left of telescope lens 18 in FIG. 1). The segmented splitting and recombining arrays 12 and 14, respectively, do not need to be the conventional f1 focal length from the main lenses, as the input optical beam 16 is collimated in this region and is not imaging. The segmented arrays 12 and 14 can then be quite close to the telescope lenses 18 and 20 which reduces the demand on the lens aperture, allowing for smaller size and weight of the overall system 10 structure.

Beam Splitting

Once the splitting segmented array 12 receives the collimated input optical signal 16 thereon, each movable element $12_1$-$12_n$ is controlled by the electronic controller via position commands to steer that specific element's reflected beamlet $16_1$-$16_n$ out to pass through a specific optical path with optical path length $d_n$. The steering is done with a high degree of accuracy to ensure that each beamlet $16_1$-$16_n$ of light projected from the segmented array 12 focuses down to the point on the optical axis of the telescope lens 18 leading into the $d_1$-$d_n$ path which has been selected for the specific beamlet. When this is done accurately, then the specific beamlet from the elements $12_1$-$12_n$ passes back through the left hand side 4-f telescope lens 18, is focused to the focal plane FP2 to the right of the 4-f telescope lens 18, and then is collimated by one of the plurality of lenses in the collimating lenslet array 32 in front of (i.e., to the left of) the VODA 22 in FIG. 1.

Variable Optical Dispersion Array (VODA) Modulation

The VODA 22 in one embodiment is made up of an array of the optical delay components $d_1$-$d_n$, each of which takes in a beamlet $16_1$-$16_n$ of focused light, passes it through a specific one of its optical delay components to generate a controlled time delay for each specific beamlet, and then outputs a focused beamlet. The beamlets $16_1$-$16_n$ are all output in the same form in which each entered the VODA 22. Each optical delay component $d_1$-$d_n$ provides a specific optical path length, and thus a specific, highly controlled time delay to its associated beamlet $16_1$-$16_n$, which is consistent and is measured during calibration of the system 10. The array of optical delay components $d_1$-$d_n$ in the VODA 22 thus provides multiple possible time delays to access. A 2D array of such optical delay components $d_1$-$d_n$ may then provide large numbers of possible time delays, in the realm of 10-100 or even more. Large scale time delay compensation can be carried out by pointing the beamlets from a plurality of the segmented array's 12 element's $12_1$-$12_n$ at the desired discrete optical delay component $d_1$-$d_n$. This enables the segmented array 12 to apply bulk time delay compensation, bringing each element $12_1$-$12_n$ to roughly the target value by applying the calibrated time delay that is closest to the required time delay for the element. Fine modulation may optionally then be provided by appropriate signals from the electronic controller 24 to perform piston modulation of the splitting and recombining elements $12_1$-$12_n$-$14_1$-$14_n$. Each of these elements $12_1$-$12_n$-$14_1$-$14_n$ (i.e., reflectors in this example) can provide a small amount of path length correction via piston motion, but not enough to account for the full scale of possible time delay. The combined bulk time delay control via the VODA 22 and fine modulation by the splitting/recombining segmented arrays 12 and 14 allows for the precise application of the desired time delay to each element $12_1$-$12_n$ and $14_1$-$14_n$ in the segmented arrays 12 and 14, respectively.

Beamlet Recombining

After the beamlets $16_1$-$16_n$ pass through the VODA 22, the beamlets are returned to a focusing form, the same as when they entered the VODA. This focus is aligned to the focal plane FP3 of the right hand 4-f telescope lens 20, so the beamlets $16_1$-$16_n$ are collimated by the right-hand 4-f telescope lens. Each collimated beamlet $16_1$-$16_n$ illuminates a single element $14_1$-$14_n$ on the recombining segmented array 14, which has the element angled as the conjugate angle to its paired element $12_1$-$12_n$ on the splitting segmented array 12. The net result is that the beamlet $16_1$-$16_n$ is emitted along the optical axis of the system 10, in parallel to the other beamlets emitted from other elements $14_1$-$14_n$ in the recombining segmented array 14. Thus the recombining array 14 removes the custom angular directional orientations added to the beamlets $16_1$-$16_n$ and reforms them into the single, collimated, temporal dispersion corrected optical beam 16' directed along the optical axis of the telescope lens 20.

Output

Once collimated and temporal dispersion corrected, the collimated, temporal dispersion corrected optical beam 16' reflected from the recombining segmented array 14 passes through the right hand 4-f telescope lens 20 and is focused to the mirror 30. Mirror 30 then redirects the optical beam 16' out from the system 10.

Beam Reversal VODA Approach

Figure 2:
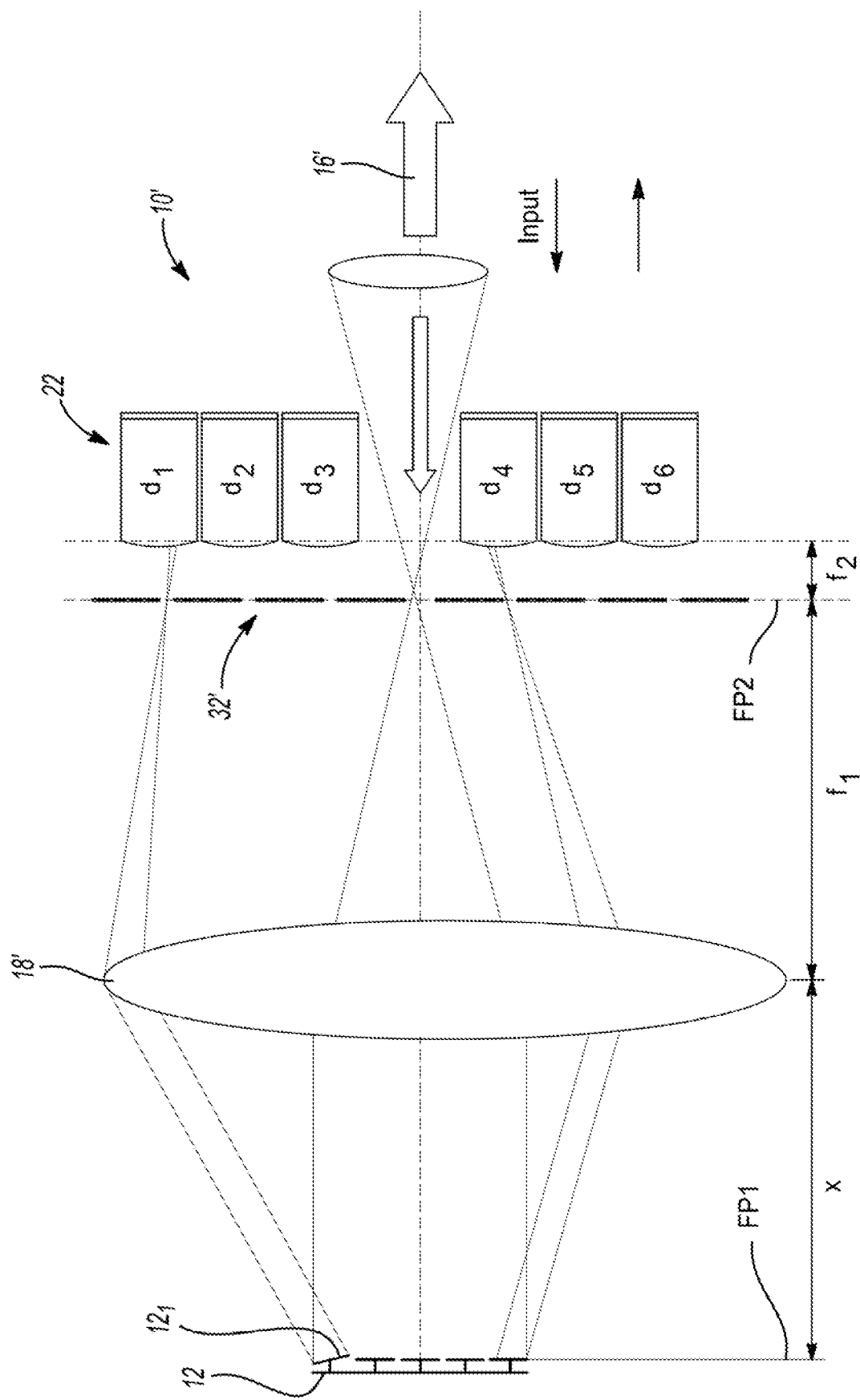
FIG. 2 is another embodiment of the present disclosure which forms a reflective temporal dispersion correction system for a received optical input signal from an external subsystem.

Referring to FIG. 2, a high-level block diagram of a system 10' in accordance with another embodiment of the present disclosure is shown. The system 10' operates in a somewhat similar manner to the temporal dispersion correction system 10, and some of the same components as the system 10, but is of significantly smaller size, and includes a reduced component set. For convenience, components in common with the system 10 will be with a prime (') symbol to help in explaining the system 10'. The controller 24 has not been shown in FIG. 2, but it will be appreciated that the controller 24 will be in communication with both the segmented array 12' and the VODA 22' to supply position control signals to the segmented array 12'.

The benefits provided by the system 10' are accomplished by configuring the system 10' to operate in a reflective mode. In a reflective mode, the beamlets $16_1$-$16_n$ are reflected off a mirrored surface in the VODA 22, thus returning them back out the same aperture they entered the VODA. The returning beamlets $16_1$-$16_n$ of light may reuse the same large lens (e.g., element of lens 32) and will bounce off the same element $12_1$-$12_n$ of the splitting segmented array 12 in the recombining operation as each did for the splitting operation. This embodiment reduces the required number of lenses and segmented arrays required. The drawback is that the input and output light need to be separated, for example by a beam splitter, which may likely suffer the drawback of a reduction in laser power, or by a polarization-based approach.

Additional VODA Embodiments

As should be understood from the above description of the system 10, the VODA 22 forms a variable optical delay array made up of an array of optical delay components, each tuned to a different and known (via calibration) optical delay. Ideally, the known delays cover a full range from near 0 to the maximum required delay. The optical delay components $d_1$-$d_n$ can be generated through several means. The use of lenses with focal length f2 at either end ensures that the path length changes are applied to the beamlets $16_1$-$16_n$ while they are collimated, thus removing any issues with image distortion as might occur if the light is focusing on a particular plane.

Figures 3A, 3B, 3C, 3D:
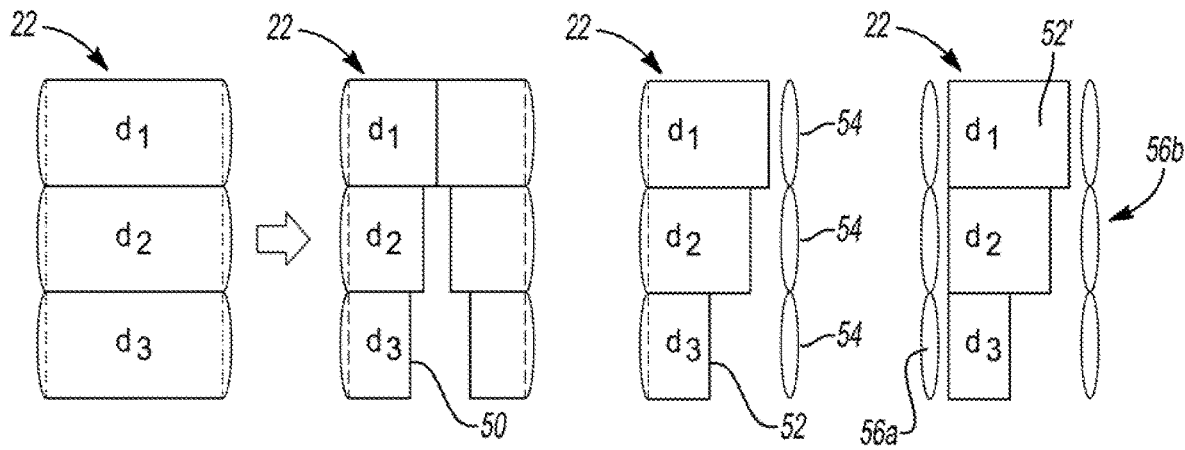
FIG. 3a is a high level side view of the delay elements forming a portion of the variable optical dispersion array (VODA)
FIG. 3b is a high level side view of another embodiment of the delay elements of the VODA where the delay elements incorporate symmetrical "step" or "wedge" shapes of differing dimensions, combined with air gaps, to provide the varying optical path length delays.
FIG. 3c is a high level side view of another embodiment of the delay elements of the VODA where the delay elements include step or wedge shapes, with a separate lenslet also being used with each delay element, to help create the optical path length delay for each delay element.
FIG. 3d is another variation of the delay element design shown in FIG. 3c where groups of lenslets are used on opposing sides of each step or wedge shaped element to help for the optical path length delay for each delay element.

For the transmissive design of the VODA 22, as described in connection with the system 10, the delay components $d_1$-$d_n$ can either be glass with different indices of refraction, or the elements $d_1$-$d_n$ may be glass wedges. This is technique is illustrated in FIGS. 3a-3d. FIG. 3a shows the VODA 22 with three optical path delay components $d_1$, $d_2$ and $d_3$. It will be appreciated, however, and as explained above, in practice there may be dozens or more such delay components, and the total number will depend on the total number of independent optical signal channels the system 10 is configured for. FIG. 3b shows the delay components $d_1$-$d_3$ formed as "steps" or "wedges", in this example made of glass, with different dimensions. Each of the delay components $d_1$-$d_3$ in FIG. 3b provide a unique optical path length through the use of a unique combination of material (e.g., glass) and air gap, which cooperatively determine the effective optical path length of each delay component $d_1$-$d_3$. A symmetric approach may be preferred for structural stability, such as shown in FIG. 3b, and this approach may also help enable machining the lenslet structure onto one of the faces of the glass wedge structure. However, an asymmetric layout of the glass may produce the same optical path length, as indicated in FIG. 3c, in which lenslets 54 are used with the path delay components $d_1$, $d_2$ and $d_3$ to help provide the different optical delay paths. It may be preferred, for simplicity of design, to assemble the VODA 22 from two lenslet arrays 56a and 56b, together with a single asymmetric glass wedge structure 52' having different, selectively shaped step or wedge sections, as shown in FIG. 3d.

Figures 4A, 4B, 4C:
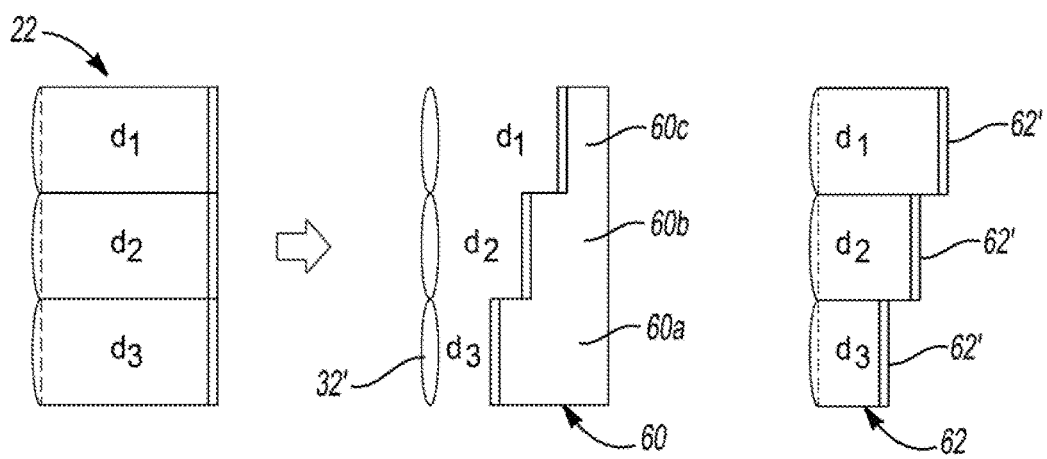
FIG. 4a is a high level side view of the delays elements of the VODA, the same as FIG. 3a, but repeated here to help with the explanation of the different reflective embodiments of the delay elements shown in FIGS. 4b-4e.
FIG. 4b is another embodiment of the VODA where a reflective structure with step or wedge shaped sections is used, together with a lenslet array, to help form the delay elements with selectively varying optical path lengths.
FIG. 4c shows another embodiment of the delay elements of the VODA where a structure is used which has a step or wedge shaped construction, with each step or wedge section including a flat reflective surface thereon for reflecting a beamlet back through the same step or wedge shaped section.
Figures 4D, 4E:
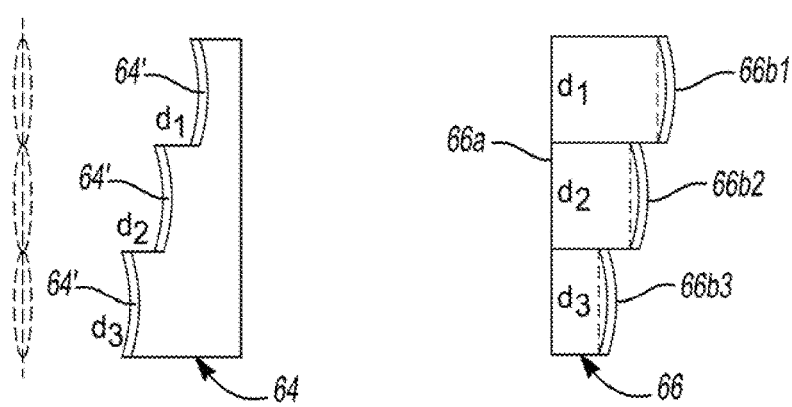
FIG. 4d shows yet another embodiment of the delay elements where a monolithic reflective structure with a step or wedge shaped surface is formed with curved, reflective faces.
FIG. 4e is yet another embodiment of the delay elements where the delay elements form a stepped or wedge shaped structure, with each having a curved rear surface with a reflective coating thereon, which operates to reflect and refocus each beamlet back through the structure.

For the reflective temporal dispersion correction (TDC) layout of the VODA 22 shown in FIGS. 4a-4d, the optical path length modulation may be carried out using several different approaches. FIG. 4a shows the VODA 22 like in FIG. 3a with three optical path delay components $d_1$, $d_2$ and $d_3$. First, as shown in FIG. 4b, a stepped, internal reflective structure 60 is formed, with each "step" or "wedge" 60a, 60b and 60c of the structure 60 providing a selected optical path delay $d_1$, $d_2$ and $d_3$, and where the structure 60 is aligned to a lenslet array 32'. Second, as shown in FIG. 4c, a stepped surface 62 (e.g., stepped glass or other material surface) could be used along with a reflective coating 62' which is deposited on a rear surface of each optical path delay component $d_1$-$d_3$. Alternately, as shown in FIG. 4d, a monolithic structure 63 (e.g., made from glass) could be formed, but this time instead of the reflective surfaces 64 associated with each optical path delay component $d_1$-$d_3$ being flat, the structure 64 is formed with a plurality of step or wedge shaped sections forming the delay components $d_1$-$d_3$, and where each step includes a curved surface 64' which has a curvature designed to precisely refocus the defocusing light and reverse its path. This means the additional optical path length is obtained while the light is focusing/defocusing instead of while collimated.

It is expected that a preferred instantiation for the reflective VODA 22 in the beam reversal TDC layout will be the structure 66 shown in FIG. 4e. The structure 66 has a flat face 66a located at the focal plane of the main 4f telescope lens (i.e., 4-f telescope lens 18 in FIG. 1), then with curved reflectors 66b1-66b3 on the back. This can be produced out of a single piece of material, for example a single piece of glass, with one side coated with a reflective film and the other side coated to form a pinhole aperture mask.

A principal advantage of the system 10 is that the monolithic nature of the VODA 22 makes it easy to manufacture and even more stable in operation. The VODA 22 may manufactured from glass or even injection molded from a transmissive polymer, for low cost, lower stability versions. The curved reflectors 64' (FIG. 4d) or even the lenslet array 32' (FIG. 4b) may be replicated with 2-photon machining within a solid glass block, either to create voids in the glass or to change the index of refraction sufficient to mimic the necessary optical elements. The entrance aperture side of the VODA 22 may also be curved slightly to map accurately to the focal plane of the 4f telescope lens 18 if needed.

Broadband Operation

In certain cases it may be desired to have the system 10 employ wide spectrum compensation capabilities. This would be the case when using a segmented array to carry out wideband imaging, for example color or even hyperspectral imaging. A reflective optical element can generally induce less wavelength dependent distortion than transmissive optics, so the lens components in the various embodiments of the VODA 22 described herein could be replaced with concave mirrors. The path reversal embodiments (FIGS. 4b-4e) could be utilized where all lenses are replaced with correctly curved mirrored surfaces and the VODA configuration could be shifted to the method of reflecting light off a stepped reflective surface. In less exacting situations achromatic lenses can be used to provide multi-spectral compensation.

Pinhole Apertures

In one or more embodiments of the VODA 22, for example the system 10 of FIG. 1, the lenslet arrays 32 and 34 are placed on opposing sides of the VODA 22. The lenslet array 32 includes a plurality of pinhole apertures $32_1$-$32_n$, one for each delay component $d_1$-$d_n$, which are arranged along the optical axis of each delay component, and where the lenslet array 32 forms a first aperture block. Likewise, the lenslet array 34 includes a plurality of apertures $34_1$-$34_n$, one for each delay component $d_1$-$d_n$, and arranged along the optical axis of each delay component, and forms a second aperture block. The lenslet arrays 32 and 34 may be placed at the entrance and exit of the VODA 22 to help attenuate stray light, as shown in FIG. 1, such that only light impinging the aperture at a predetermined angle is able to pass through each of the aperture $32_1$-$32_n$ and enter a respective one of the delay components $d_1$-$d_n$ of the VODA 22, and such that only light exiting the delay components $d_1$-$d_n$ along an optical axis of each of the delay components will be able to pass through a respective one of the apertures $34_1$-$34_n$ of the lenslet array 34. The apertures $32_1$-$32_n$ and $34_1$-$34_n$ may be formed by pinholes located at the optical axis of the delay components $d_1$-$d_n$ lenslet or a curved reflective mirror to selectively allow light to pass only when it is lined up along the optical delay element's optical axis. Optionally, the apertures may be formed by a separate piece of material with selectively located holes formed in it. Alternatively, it may be formed by just a coating on the lenslet array 32 and/or 34, with the coating removed at the each desired pinhole location. Such alignment ensures that the beamlets $16_1$-$16_n$ leaving the splitting segmented array 12 are precisely aligned to land on the corresponding element of the recombining segmented array 14. Poor alignment to the VODA 22 would result in a lateral shift of the imaging of the splitting segmented array 12 onto the recombining segmented array 14. This would create a situation where the temporal dispersion compensation on the beam would not map accurately to the segmented array 14, producing a small amount of uncorrected light. Selectively located pinhole apertures formed in the lenslet arrays 32 and 34 which bound the VODA 22 either only on the entrance or on both sides of the VODA remove this issue, effectively blocking any light which would produce an unwanted shifted image from reaching the re-combining segmented array 14. While these pinholes or apertures $32_1$-$32_n$ and $34_1$-$34_n$ filter out unwanted image shift, they also present a precision challenge for the segmented array 12, which needs to be able to precisely point (i.e., steer) the beamlets $16_1$-$16_n$ through the apertures or pinholes, as well as for the segmented array 14, which needs to be able to aim its optical components $14_1$-$14_n$ at precise angular orientations or to receive the beamlets $16_1$-$16_n$ exiting the apertures $34_1$-$34_n$ of the lenslet array 34.

The manufacturing of the pinholes could be carried out by first measuring for the optical axis with a vertical testing laser. The optical axis is found when the testing laser beam reflects directly back along its axis. The location of this point may be recorded in the laser manufacturing system's memory. A coating may be applied to the surface, then the laser manufacturing system may return to the stored locations to laser cut away the coating at the specific pinhole locations.

Precision X-Y Axis Alignment for the VODA

Ideal operation of the VODA 22 requires precise alignment of the beamlets $16_1$-$16_n$ to the optical axis of each optical delay component $d_1$-$d_n$ in the VODA, whether or not the pinhole aperture is used. Maintaining such precision can be difficult during harsh environmental conditions (e.g., high mechanical and thermal noise, long duration, etc.). This alignment is referred to as "X-Y axis alignment", since the Z-axis is aligned to the main optical axis. Thus the alignment of the focal point to the pinhole aperture is a search done along an X-Y plane.

While the segmented arrays 12 and 14 can be calibrated to the exact points for each element in the VODA 22, an even more robust approach is to enable the splitting segmented array 12 to receive feedback about its alignment, so the precision can be robustly maintained. A simple way of achieving this is by using a gyration-based lock-on approach that requires the a) pinhole apertures, b) a segmented array which can carry out high frequency small scale gyrations and c) an optical intensity sensor which can read the intensity of the light either impinging on the aperture or passing through the aperture. Precision alignment would then be obtained through the following steps. First, the splitting segmented array 12 is controlled by the controller 24 to align each of its optical elements $12_1$-$12_n$ so that each beamlet $16_1$-$16_n$ is aligned to the approximate location of its associated pinhole, based on stored pinhole coordinates, for example in the data library 26 (FIG. 1). Second, an associated one of the splitting array elements $12_1$-$12_n$ is controlled such that it begins to gyrate over a small angle, sweeping out first a circle and later a spiral if the signal cannot be found. This gyration may occur at a specific frequency, for example a frequency that is different for each element $12_1$-$12_n$ in the segmented array 12. Third, a photodetector for the specific optical delay component may be interrogated for any sign of a signal at the specific gyration frequency. Fourth, the intensity and phase delay of the signal observed on a photodiode may be to generate the feedback needed by the splitting array element $12_1$-$12_n$ to converge onto the pinhole. Depending on the orientation and scale of misalignment, the signal picked up by the photodiode may show a unique amplitude and phase delay. This may become particularly effective once the beamlet is approximately aligned with the hole. This approximate alignment will help the intensity signal to translate into an accurate measure of scale of misalignment, with phase being an accurate measure of orientation of misalignment. Then the feedback process will tend to drive the gyrations to oscillate a given one of the beamlets $16_1$-$16_n$ in a circle around the circular pinhole, resulting in a constant signal to the photodiode. The gyration process thus finds the ideal alignment to the pinhole. Once aligned, the gyration may be halted and the specific beamlet $16_1$-$16_n$ pointed down the center of its associated pinhole. The process may be repeated each time the beamlet $16_1$-$16_n$ is redirected to a new optical delay component $d_1$-$d_n$ as well as at periodic intervals (for example every 10 ms) to remove thermal or mechanical variation. The feedback process will also work with a sensor located around the pinhole, or one located behind the mirrored reflectors in the beam reversal design. The mirrors will need to be slightly transmissive, perhaps about 0.1% or so, to allow the photodetectors to work with some signal.

Precision Z-Axis Alignment for VODA

The exact location of the VODA 22 along the optical axis does not matter for the transmissive system 10 (e.g., FIGS. 3a-3d) design, however it is significant for the beam reversal TDC design (FIGS. 4a-4e). The VODA 22 Z-axis location determines the path length, and thus the time delay, for each delay component $d_1$-$d_n$ in the array. If the VODA 22 uniformly translates along the Z-axis, then all optical delay components $d_1$-$d_n$ in the VODA 22 array will see a uniform increase in their optical path length and time delay. This means the relative control of time delay is retained. But if the VODA 22 rotates around the X axis or the Y axis, then parts of the VODA will be brought closer to and further from the splitting segmented array 12, thus changing their time delay effect. This needs to be known exactly to ensure that controllable, variable optical path delays can be generated. The most effective means to mitigate the issue of VODA 22 rotation, and thus variation in relative optical path time delays, is to use the entire system 10 to test the time delay effect at various intervals, for example every second. During testing, two segments may be used from opposite ends of the steering array. They may each be pointed to the same large angle, the maximum angle possible for the steering elements. At this angle, the elements will be steering a wideband beam into a known location calibration diode. The VODA 22 may apply temporal correction to the two steered elements, the minimum correction to one element and the maximum correction to the other. The VODA 22 is preferably laid out such that on each axis of its 2D array there is a maximum delay component $d_1$-$d_n$ at one edge and a minimum delay component $d_1$-$d_n$ at the opposite edge. These maximum and minimum delay components would be utilized to compensate for the two steered elements. If the VODA 22 is at the desired location and flat, then the applied temporal delay will cause the wideband beam to positively cohere on the calibration diode. This may be tested by oscillating the two steered mirrors to shift the interference pattern across the calibration diode. If the VODA 22 is tilted, then the applied temporal delay will not be the expected temporal delay, and the resulting interference pattern will be spatially shifted. Thus, the interference pattern observed by the calibration diode will show an error between the expected steering angle to produce the interference fringes, and the actual steering angle that is a direct function of the error in temporal delay. The error in temporal delay can be mapped to a change in optical path length between the two edges of the VODA 22, and thus used to determine the tilt of the VODA. The time delay associated with each element $d_1$-$d_n$ in the VODA 22 can then be updated to account for the tilt. Such calibration would need to be done for each of the X axis and the Y axis. The tip/tilt calibration process requires only the occasional driving of two elements on the steering array and a single calibration diode at the edge of the optical aperture. The net result is that the system 10 is able to retain precision temporal delay control even through different environments, over time, and even if the structural frame supporting the VODA 22 shifts.

Large Scale Piston Arrays

Other approaches can be used to achieve temporal dispersion compensation. While a compensation approach drawing on MEMS is preferred for size, weight, power and speed reasons, it need not be a tip/tilt steering array. A segmented mirror piston array could be used to provide some of all of the temporal dispersion compensation by locating the segmented mirror piston array on a conjugate image plane to the segmented steering mirror. This would superimpose the piston motion generated by the piston array on top of the steering motion generated by the steering array. Depending on the scale of piston motion in the piston array, this may be sufficient to compensate for some or all of the temporal dispersion. While this design is straightforward, it places high demands on the piston array, which would need to be able to move approximately as fast as the steering array to avoid degrading the system performance, and should have several millimeters worth of travel and nanometer scale resolution. Many MEMS piston arrays presently exist; however none presently have the necessary combination of performance metrics. Piezo-walk actuators could produce the range and resolution if speed is not critical. The steering aperture could be broken into a section of sub-apertures, with each sub aperture provided with a piston modulation capability. This would enable larger piston actuators for higher speed at the expense of precise and complete dispersion compensation. The sub aperture approach would provide temporal compensation for the average of the sub aperture, which would work well for steering cases where the temporal dispersion does not change rapidly across the aperture.

Reflective Path Arrays

An additional approach to generating optical path delays can be carried out using the beam in fully collimated space as shown in FIG. 5. In this approach, all of elements $12_1$-$12_n$ making up the entire splitting segmented array 12 can be pointed at flat reflective surfaces 70, 72, 74 and 76, which are at different angular locations relative to the splitting segmented array 12. These reflective surfaces 70-76 collectively form the VODA 22 for this embodiment. Each reflective surface 70-76 is as large as the splitting segmented array 12, so all elements $12_1$-$12_n$ of the splitting segmented array 12 can sequentially point to a spot on each one of the flat reflective surfaces 70-76, transmitting the collimated beam to these surfaces without any distortion. Each flat reflective surface 70-76 represents a different optical path, with a different distance from the splitting segmented array 12. Thus the splitting segmented array 12 can chose several possible paths, each one associated with a given one of the mirrors 70-76, and each thus having a different time delay. The difficulty in this approach is the use of the beam in the collimated mode for extended distances, which can make it difficult to regenerate a clean beam at the end.

Referring to FIG. 6, a high level flowchart 100 of a method of modifying a temporal configuration of an optical beam in accordance with the present disclosure is illustrated. At operation 102 the input optical beam is segmented into a plurality of beamlets (e.g., beamlets $16_1$-$16_n$). This may be done in one embodiment using the segmented array 12 of the system 10. At operation 104 the beamlets (e.g., beamlets $16_1$-$16_n$) are steered along selected angular transmission paths which are non-parallel to one another. At operation 106 predetermined time delays may be applied to selected ones of the beamlets, such that the predetermined time delays create an optical beam having a second temporal configuration different from the first temporal configuration.

Figure 7:
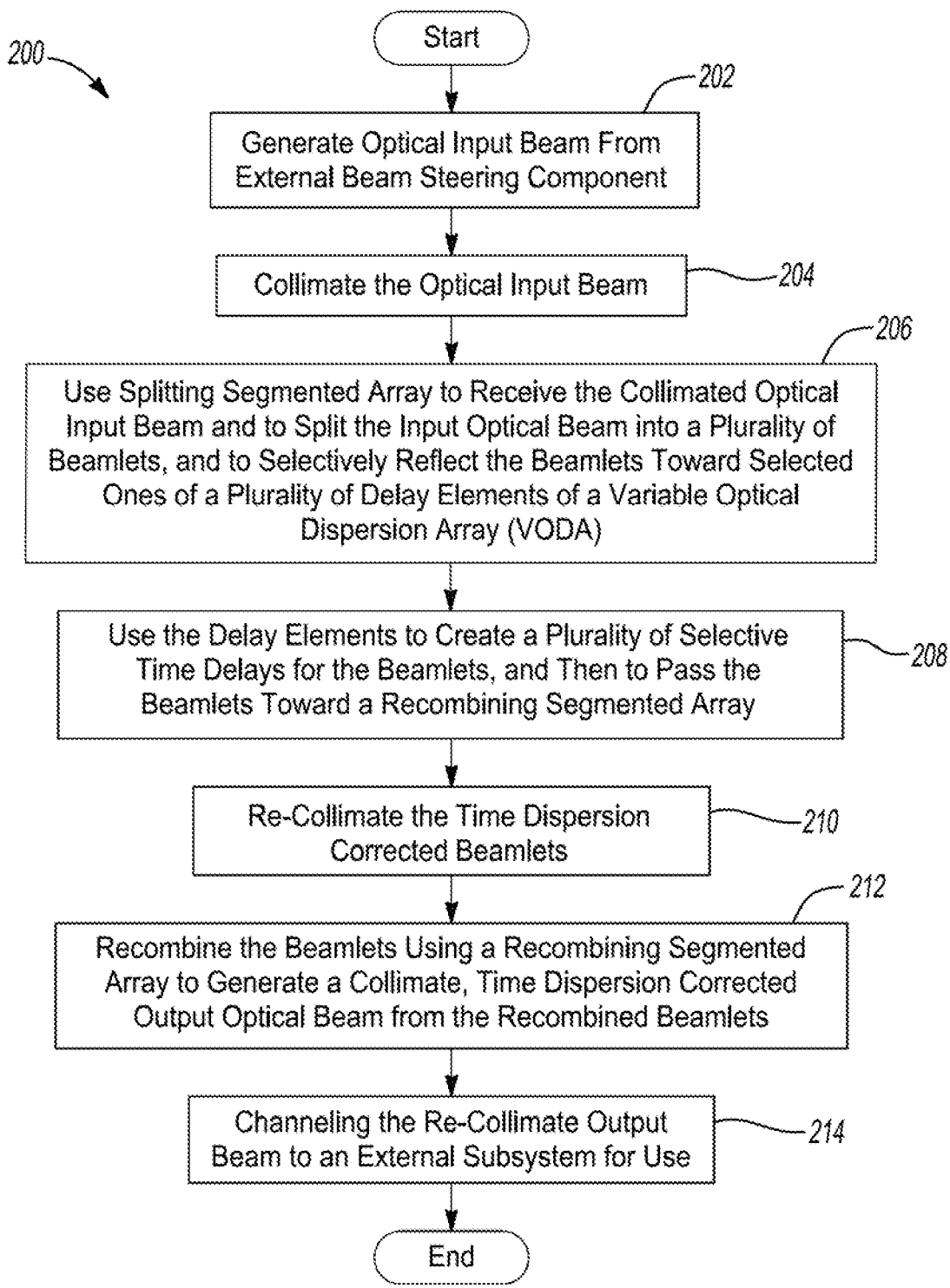
FIG. 7 is a high level flowchart setting forth operations defining a method for implementing the transmissive dispersion correction approach of the system shown in FIG. 1.

Referring briefly to FIG. 7, a high level flowchart 200 summarizing major operations performed by the system 10 of FIG. 1 is provided. At operation 202 an optical input beam is generated from an external component, for example an external beam steering component. At operation 204 the optical input beam (e.g., beam 16) is collimated, for example using the telescope 18, and then split into a plurality of beamlets (e.g., beamlets $16_1$-$16_n$) by a splitting segmented array (e.g., segmented array 12), as indicated at operation 206. The beamlets are then selectively steered toward selected ones of a plurality of optical path delay components (e.g., delay components $d_1$-$d_n$ of the VODA 22). At operation 208 the delay elements are used to impart a time delay to selected ones of the beamlets, after which the beamlets are re-collimated at operation 210. At operation 212 the beamlets $16_1$-$16_n$ are recombined (e.g., by the re-combining segmented array 14) to form a collimated, time dispersion corrected output optical beam. At operation 214 the collimated, time dispersion corrected output optical beam is channeled out to a desired subsystem for use.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The present disclosure addresses the challenge of temporal dispersion when using a segmented beam steering array, which has limited the application space of the segmented beamsteering technology. There are a range of important applications that require using segmented beamsteering with CW and long pulse laser systems, such as monochromatic laser manufacturing; sensing or communications laser communications. The capability to operate with wideband sources or ultrashort pulses, which the embodiments of the present disclosure provide, is expected to significantly boost application utility in many of these cases-short pulse lasers for cleaner laser cut features in manufacturing, wideband sensing for enhanced range or data quality in sensing, and wideband data transfer in laser communications. An important advantage provided by the embodiments discussed herein is that each enables dynamically compensating for temporal dispersion such that a temporal dispersion compensator and a segmented array could be synchronous operated to retain the full segmented steering capabilities of the segmented array, but now with no or virtually no temporal dispersion. Complete temporal dispersion compensation enables wideband pulse transfer, ultra-high rate wideband optical communications and even direct wideband imaging. Segmented arrays may thus now be used for stabilizing optical communications links with data rates (>>10 Gbps) sufficient to support graving needs, and it is expected that the embodiments of the present disclosure may eventually replace gimbals in high performance telescopes, while still collecting high resolution wideband images, among providing many other useful imaging capabilities.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A system for modifying temporal dispersion in an optical signal, the system comprising:
   a segmented array including a plurality of independently controllable, reflective optical elements configured to:
   segment a received input optical signal into a plurality of beamlets, and
   reflect and steer selected ones of the plurality of beamlets in predetermined angular orientations therefrom, the predetermined angular orientations being selected in accordance with a time delay needing to be applied to each of the selected ones of the plurality of beamlets; and
   a variable optical dispersion subsystem including a plurality of optical components, the plurality of optical components being configured to impart different predetermined time delays to specific received ones of the plurality of beamlets, and to output the beamlets therefrom.

2. The system of claim 1, wherein the plurality of optical components of the variable optical dispersion subsystem comprises a plurality of transmissive optical components.

3. The system of claim 1, wherein the plurality of optical components of the variable optical dispersion subsystem comprises a plurality of reflective optical components.

4. The system of claim 1, further comprising:
   a lenslet array disposed adjacent to the variable optical dispersion subsystem,
   wherein the lenslet array includes a plurality of apertures, and
   wherein the plurality of apertures are configured to provide predefined angular entry paths to associated ones of the plurality of beamlets, to direct each beamlet towards an associated one of the plurality of optical components.

5. The system of claim 4, wherein:
   the plurality of beamlets being received by the segmented array comprises a collimated plurality of beamlets; and
   the system further comprises a lens disposed in an optical path between the segmented array and the lenslet array for receiving the collimated plurality of beamlets and focusing each one of the collimated plurality of beamlets received from the segmented array into a diverging beamlet along a predetermined angular path toward the variable optical dispersion subsystem.

6. The system of claim 1 further comprising:
   a lenslet array disposed adjacent to the variable optical dispersion subsystem,
   wherein the lenslet array includes a plurality of apertures,
   wherein the plurality of apertures are configured to provide defined angular exit paths for the plurality of beamlets passing through the variable optical dispersion subsystem to emit each one of the plurality of beamlets exiting the lenslet array at a specific angular orientation, and
   wherein the plurality of apertures are configured such that the plurality of beamlets exiting the lenslet array forms a diverging plurality of beamlets.

7. The system of claim 5 further comprising:
   a lens element disposed in an optical path downstream of the variable optical dispersion subsystem,
   wherein the lens element is configured to (i) receive the diverging plurality of beamlets after the diverging plurality of beamlets has passed through the variable optical dispersion subsystem and (ii) collimate the plurality of diverging plurality of beamlets to form a collimated optical beam.

8. The system of claim 7, further comprising an additional segmented array for receiving the collimated optical beam from the lens element and reflecting beamlets making up the collimated optical beam at optical angles such that all of the beamlets of the collimated optical beam are transmitted back toward the lens element along a path parallel to an optical axis of the lens element, and to be output from the system.

9. The system of claim 1, wherein:
   the plurality of optical components of the variable optical dispersion subsystem comprises a plurality of spaced apart reflective components each oriented at a desired angle relative to an axial center of the segmented array, and each having an area at least as large as that of the segmented array;
   the plurality of optical components of the variable optical dispersion subsystem is configured to create a desired optical delay path for one or more of the plurality of beamlets received thereon; and
   the segmented array acts to both create and transmit the plurality of beamlets therefrom, and to receive the plurality of beamlets back from the plurality of optical components of the variable optical dispersion subsystem.

10. The system of claim 9, wherein the plurality of beamlets are maintained in a collimated form during transmission from the segmented array toward the plurality of optical components, and back from the plurality of optical components toward the segmented array.

11. The system of claim 1 wherein each component of the plurality of optical components is configured to, in response to receiving ones of the plurality of beamlets, (i) impart a specified time delay to the ones of the plurality of beamlets to create time-delayed beamlets and (ii) output the time-delayed beamlets.

12. The system of claim 11 wherein, for each component of the plurality of optical components, the specified time delay is fixed.

13. The system of claim 12 wherein, for each component of the plurality of optical components:
the component includes a portion of a first material; and
the specified time delay is defined by at least one of a thickness of the portion, a height of the portion, a size of an air gap associated with the portion, or an optical property of the first material.

14. The system of claim 1 wherein each component of the plurality of optical components is configured to apply a time delay that is set independently of time delays of others of the plurality of optical components.

15. The system of claim 1 wherein the time delay needing to be applied to each of the selected ones of the plurality of beamlets is determined individually for each of the selected ones of the plurality of beamlets.

16. A system for removing temporal dispersion in an optical signal, the system comprising:
a first segmented array including a first plurality of independently controllable optical elements configured to segment a received input optical signal into a plurality of beamlets, and to reflect the beamlets at selected angular orientations therefrom;
a variable optical time dispersion array having a plurality of optical delay components each designed to impart a specific optical path delay for one of the plurality of beamlets passing therethrough, to thus impart a unique, selected time delay to specific ones of the plurality of beamlets passing therethrough, wherein the reflected beamlets are selectively steered by the first plurality of optical elements of the first segmented array to specific ones of the plurality of delay components to enable the plurality of delay components to impart the unique, selected time delays to specific ones of the plurality of beamlets; and
a second segmented array having a second plurality of independently controllable optical elements configured to receive the plurality of beamlets from the variable optical time dispersion array and to recombine the beamlets to form a time dispersion corrected output optical signal.

17. The system of claim 16, further comprising a first telescope element for collimating the input optical signal prior to the input optical signal being received by the first segmented array.

18. The system of claim 17, further comprising a first lenslet array having a first plurality of apertures configured to admit only ones of the plurality of beamlets having a predetermined angular path of travel into the variable optical time dispersion array.

19. The system of claim 11, further comprising a second lenslet array having a second plurality of apertures and configured to output only ones of the plurality of beamlets having a predetermined angular path of travel exiting the variable optical time dispersion array.

20. The system of claim 19, further comprising a second telescope element for collimating the plurality of beamlets output from the second lenslet array prior to the plurality of beamlets reaching the second segmented array.

21. The system of claim 11, wherein the first plurality of independently controllable optical elements of the first segmented array and the second plurality of independently controllable optical elements of the second segmented array are equal in number.

22. The system of claim 16, wherein the plurality of delay components of the variable optical time dispersion array equals:
a total number of the first plurality of independently controllable optical elements of the first segmented array; and
a total number of the second plurality of independently controllable optical elements of the second segmented array; and.

23. The system of claim 16, wherein the plurality of delay components comprises differing materials to vary an optical beamlet travel time through each in a controlled, predetermined manner.

24. The system of claim 11, wherein:
the plurality of delay components comprises step shaped components, and
selected ones of the plurality of delay components have an associated air gap, so that the plurality of delay components defines differing optical path lengths for the plurality of beamlets entering the variable optical time dispersion array.

25. The system of claim 16, wherein each of the plurality of delay components:
includes a reflective surface material on one surface thereof, and
has dimensions to control times of travel of the plurality of beamlets before ones of the plurality of beamlets are reflected by the reflective surface material back out of the variable optical time dispersion array.

26. The system of claim 16 wherein, for each component of the plurality of delay components, physical properties of the component are designed to impart a fixed specific optical path delay to ones of the plurality of beamlets passing therethrough.

27. A method for modifying an optical signal, the method comprising:
splitting a collimated optical beam having a first temporal configuration into a plurality of beamlets;
steering the plurality of beamlets along selected, differing angular paths, wherein the angular paths are non-parallel to one another and associated with needed predetermined time delays to be applied to specific ones of the beamlets; and
selectively applying predetermined time delays to received ones of the plurality of beamlets, depending on a selected angular path of each received one of the plurality of beamlets,
wherein the predetermined time delays create an optical beam having a second temporal configuration different from the first temporal configuration.

* * * * *